US007774423B2

(12) United States Patent
Suzuki et al.

(10) Patent No.: US 7,774,423 B2

(45) Date of Patent: Aug. 10, 2010

(54) REMOTE START SYSTEM, REMOTE START SERVER AND COMMUNICATION TERMINAL

(75) Inventors: Takashi Suzuki, Yokohama (JP); Akira Kinno, Yokohama (JP); Hiroshi Fujimoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 233 days.

(21) Appl. No.: 11/956,940

(22) Filed: Dec. 14, 2007

(65) Prior Publication Data

US 2008/0155022 A1 Jun. 26, 2008

(30) Foreign Application Priority Data

Dec. 15, 2006 (JP) ............................ 2006-338691

(51) Int. Cl.
*G06F 15/16* (2006.01)

(52) U.S. Cl. ...................................... 709/208; 709/217

(58) Field of Classification Search ................. 709/204, 709/208, 209, 217, 218, 219
See application file for complete search history.

(56) References Cited

U.S. PATENT DOCUMENTS 6,970,917 B1 * 11/2005 Kushwaha et al. .......... 709/217
7,343,408 B2 * 3/2008 Kushwaha et al. .......... 709/224
2002/0183051 A1 12/2002 Poor et al.
2004/0153672 A1 8/2004 Watt et al.
2004/0205755 A1 * 10/2004 Lescouet et al. ............ 718/100

FOREIGN PATENT DOCUMENTS

WO WO 94/30023 12/1994
WO WO 03/055248 A1 7/2003
WO WO 2006/077283 A1 7/2006

OTHER PUBLICATIONS

"OMA Device Management Notification Initiated Session; OMA-DM-Notification-V1_2_0-20041215-D", Open Mobile Alliance, XP-002993854, Draft Version 1.2, Dec. 15, 2004, pp. 1-15.

"OMA Device Management Notification Initiated Session", Open Mobile Alliance OMA-TS-DM-notification-V1_2-20050607-C, Candidate Version 1.2, Jun. 7, 2005, 15 pages.

* cited by examiner

*Primary Examiner*—Ramy M Osman
*Assistant Examiner*—Marshall McLeod
(74) *Attorney, Agent, or Firm*—Oblon, Spivak, McClelland, Maier & Neustadt, L.L.P.

(57) ABSTRACT

An object of the invention is to allow a program execution domain to be specified and then a start target program to be started by the specified program execution domain. Disclosed is a remote start system including a communication terminal capable of switching multiple program execution domains from one to another, and a remote start server instructing, via a network, the communication terminal to start a start target program. In the remote server, generated is a switching program start message for requesting the communication terminal to start a switching program that switches a program execution domain to a specific program execution domain for executing the start target program. The switching program start message includes a switching program ID, a parameter for starting the switching program, and a parameter for starting the start target program. The parameter for starting the switching program includes the start target program ID and domain ID.

11 Claims, 18 Drawing Sheets

FIG. 8

```
POST / xxx / xxx HTTP / 1.1
Host : mmm . nnn . xxx . yyy
Content-Type : Multipart / Related ; boundary = MIME . boundary ; type = text / xml ; charset = UTF-8
Content-Length : xxx

--MIME_boundary
Content-Type : text / xml ; charset = UTF-8

<msn> 090abcdefg </ msn>
<programid> dsw . ua </ programid>
<programparam> xxxxxxx </ programparam>
```

FIG. 16

```
<trigger-message> ::= <digest><trigger>
<digest> ::= 128*BIT                                   ; 'MD5 Digest value'
<trigger> ::= <trigger-hdr><trigger-body>
<trigger-hdr> ::= <version><ui-mode><initiator><future-use>
          <sessionid><length-identifier><server-identifier>
<version> ::= 10*BIT                                   ; 'Device Management Version'
<ui-mode> ::= <not-specified>/<background>/            ; 'Background / Informative /
          <informative>/<user-interaction>             ;  User Interaction session'
<not-specified> ::= "00"                               ; '2*bit value "0"'
<background> ::= "01"                                  ; '2*bit value "1"'
<informative> ::= "10"                                 ; '2*bit value "2"'
<user-interaction> ::= "11"                            ; '2*bit value "3"'
<initiator> ::= <client>/<server>                      ; 'Server/User initiated'
<client> ::= "0"                                       ; '1*bit value "0"'
<server> ::= "1"                                       ; '1*bit value "1"'
<future-use> ::= 27*BIT                                ; 'Reserved for future DM use'
<sessionid> ::= 16*BIT                                 ; 'Session identifier'
<length-identifier> ::= 8*BIT                          ; 'Server Identifier length'
<server-identifier> ::= <length-identifier>*CHAR       ; 'Server Identifier'
<trigger-body> ::= [<vendor-specific>]
<vendor-specific> ::= n*BIT                            ; 'Optional vendor specific info'
```

DELETION TARGET BITS

FIG. 17

| Token Stream | Description |
|---|---|
| 03 | Version number- WBXML version 1.3 |
| 0D | EMN 1.0 Public Identifier |
| 6A | Charset = UTF-8 (MIBEnum 106) |
| 00 | String table length |
| 85 | emn with attributes |
| 07 | Mailbox = "mailat" |
| 03 | Inline string follows |
| 'u','s','e','r','@','w','a','p','f','o','r','u','m',00 | String |
| 88 | ".org" |
| 05 | timestamp = |
| C3 | OPAQUE data follows |
| 06 | Length field (6bytes) |
| 20, 02, 04, 16, 06, 40 | Data |
| 01 | END (of emn and attribute list) |

DELETION TARGET BITS (rows 03, 0D, 6A)

REMOTE START SYSTEM, REMOTE START SERVER AND COMMUNICATION TERMINAL

CROSS REFERENCE TO RELATED APPLICATION

This application is based upon and claims the benefit of priority from the prior Japanese Patent Applications No. 2006338691 filed on Dec. 15, 2006; the entire contents of which are incorporated herein by reference.

BACKGROUND OF THE INVENTION

1. Field of the Invention

The present invention relates to a remote start system including a communication terminal capable of switching multiple program execution domains, and a remote start server instructing the communication terminal to start a start target program via a network. The present invention also relates to the remote start server and the communication terminal that are used in the remote start system.

2. Description of the Related Art

With the improvement of the performance and capabilities of mobile terminals such as cellular phones and PDAs, the importance of data assets to be handled on the mobile terminals is increasing. In a business system used in cooperation with mobile terminals, for example, highly important/confidential data such as personal information on clients or the like are handled on the mobile terminals. In the meantime, there always exists a risk of data leakage to a third party who has obtained a mobile terminal in an unauthorized manner because of a loss/theft of the mobile phone.

Due to such a background, a demand for remotely managing, in real time, data stored in mobile terminals has been increasing. In order to meet such a demand, proposed are a method for remotely managing a mobile terminal via a network (refer to U.S. Pat. No. 6,970,917) and a method for transmitting a remote management command by utilizing a short message service message (SMS message) (International Publication No. WO 03/055248 pamphlet).

In addition, in Open Mobile Alliance (OMA), which is a standards body for mobile-related technologies, proposed is a method for establishing a terminal management session between a terminal management server and a terminal management client by notifying a mobile terminal of a start message for requesting the starting of the terminal management client (refer to non patent document: OMA Device Management Notification Initiation Session OMA-TS-DM-Notification V1_2-20050607-C).

Specifically, as shown in FIG. 1, a terminal management sew 100 stores a DM data notification element in a wireless application protocol (WAP) Push message. An SMS server 200 stores the WAP Push message in an SMS message, and then transmits the SMS message to a mobile terminal 100.

In the message header of the aforementioned WAP Push message, a program identifier for identifying a start target program, that is, a terminal management client 401, is stored in order to distinguish the WAP Push message from other messages (such as an E-mail or a start message for a different program).

A mobile terminal 400 receives the SMS message via a NW 300. An SMS message processor 402 of the mobile terminal 400 extracts the WAP Push message stored in the SMS message.

A program starting unit 403 starts the terminal management client 401 in accordance with the program identifier stored in the message header of the WAP Push message. The terminal management client 401 starts communications with the terminal management server 100 in cooperation with a communication protocol processor 404.

On the other hand, a terminal capable of switching multiple program execution domains is known. A "program execution domain" means a program execution environment appropriate to an attribution (real-time executability, reliability, administrator or the like) of the program to be executed by the terminal.

As the terminal capable of using multiple program execution domains, there exist a terminal capable of using multiple program execution domains by switching multiple OSes (refer to US Patent Application Publication No. 200410205755) and a terminal provided with a CPU capable of switching two system states including a secure state and a non-secure state (refer to US Patent Application Publication No. 2004/0153672).

By allowing multiple program execution domains to be switched from one to another, a single terminal can be used in a different manner appropriate to the usage. The single terminal thus can be used as if multiple terminals are used.

There is an application, for example, in which a real-time OS (such as an RTOS) for executing a program that requires strict real-time control and a general purpose OS (Linux or Windows (registered trademarks), for example) are simultaneously executed. In addition, since programs each having different reliability are executed separately, Trusted OS and Untrusted OS can be simultaneously executed.

SUMMARY OF THE INVENTION

A terminal capable of switching multiple program execution domains is used in such a remote start system proposed in OMA, however, the following problem often occurs. Assume that a terminal capable of switching multiple program execution domains is used. In this case, when a remote start request is issued from a terminal management server, some of the program execution domains in operation on the terminal are sometimes different from the execution domains to which the target programs of the remote start request belong. In this respect, there is a problem that the terminal management sever cannot remotely manage the mobile terminal in real-time since the terminal management server cannot start the terminal management client.

In consideration of the aforementioned problem, an object of the present invention is to provide a remote start system, a remote start server and a communication terminal that allow to specify a program execution domain and then to start a start target program by the specified program execution domain in the remote system using a communication terminal capable of switching multiple program execution domains.

In order to achieve the aforementioned object, a first aspect of the present invention provides a remote start system including: a communication terminal (mobile terminal 5) capable of switching multiple program execution domains (program execution domains 51 and 52) from one to another; and a remote start server (remote start server 1) configured to instruct, via a network (NW 4), the communication terminal to start a start target program. In the remote start system, the remote start server includes a generator (message generator 12) configured to generate a first start message (switching program start message) for requesting the communication terminal to start a switching program that switches a program execution domain to a specific program execution domain for executing the start target program. In addition, the first start message includes a first program identifier (switching program ID) for identifying the switching program and a first program starting parameter (switching program starting parameter) used by the switching program, and a second program starting parameter (parameter for starting a start target program) used by the start target program. In the remote start system, the first program starting parameter includes a second program identifier (start target program ID) for identifying the start target program, and a domain identifier (domain ID) for identifying the specific program execution domain. Moreover, in the remote start system, each of the program execution domains of the communication terminal includes: a reconstructing unit (one of switching programs 516 and 526) configured to execute the switching program on the basis of the first start message in a case where the first start message is received, and then to request the specific program execution domain to start the start target program; and a starting unit (one of program starting units 512 and 523) configured to start the execution target program on the basis of the second start message in a case where the second start message is received. Furthermore, in the system, the second start message includes the second program identifier and the second program starting parameter. Here, a "program execution domain" means a program execution environment.

According to the first aspect, the remote start server generates the first start message for requesting the communication terminal to start a switching program that switches a program execution domain to a specific program execution domain for executing the start target program. The communication terminal executes the switching program on the basis of the first start message in a case where the first start message is received, and reconstructs the second start message for requesting the starting of the start target program to the specific program execution domain.

Accordingly, in the communication terminal, the start target program can be started by switching a program execution domain to the specific program execution domain. As a result, it is made possible to provide the remote start system capable of specifying a program execution domain and of starting a start target program by the specified program execution domain, the system using a communication terminal capable of switching multiple program execution domains.

A second aspect of the present invention provides a remote start server instructing, via a network, a communication terminal capable of switching multiple program execution domains from one to another to start a start target program. The remote start server includes: a generator configured to generate a first start message for requesting the communication terminal to start a switching program that switches a program execution domain to a specific program execution domain for executing the start target program. In the remote start server, the first start message includes a first program identifier for identifying the switching program and a first program starting parameter used by the switching program, and a second program starting parameter used by the start target program. Moreover, in the remote start server, the first program starting parameter includes a second program identifier for identifying the start target program, and a domain identifier for identifying the specific program execution domain.

According to the second aspect of the invention, it is made possible to provide the remote start server capable of specifying a program execution domain and of starting a start target program by the specified program execution domain.

A third aspect of the present invention is related to the second aspect of the invention and provides the remote start server of the second aspect in which the first program starting parameter includes a compression flag indicating whether or not the second program starting parameter has been subjected to compression processing, and the generator performs compression processing for the second program starting parameter and sets the value of the compression flag to indicate that the parameter has been subjected to the compression processing, in a case where the data length of the second program starting parameter is greater than a specified value.

According to the third aspect, the second program starting parameter is subjected to the compression processing in a case where the data length of the second program starting parameter is greater than a specified value. The first program starting parameter used by a switching program, thus can be stored in the first start message without changing the current format of the first start message. Specifically, an adverse increase in communication traffic due to an increase in the data length of the first start message can be avoided.

A fourth aspect of the present invention is related to the third aspect of the invention and provides the remote start server of the second aspect in which the generator controls the compression processing in accordance with the second program identifier.

According to the fourth aspect, the generator performs compression processing in accordance with the second program identifier for identifying the start target program. The compression method can be thus changed for each start target program. Since compression processing appropriate to the start target program can be thus performed, the compression rate of the second program starting parameter can be improved.

A fifth aspect of the present invention is related to the second aspect of the invention and provides the remote start server of the second aspect in which the generator stores, in the first start message, location information (URI information) indicating the location, on the network, of the second program starting parameter as the second program starting parameter, and also stores, in the first program starting parameter, information indicating that the second program starting parameter is the location information.

According to the fifth aspect, the first start message stores the location information as the second program starting parameter, and the actual parameter of the second program starting parameter is arranged on the network. The first start message thus can store, without changing the format of the current first start message, the first program starting parameter used by the switching program. Specifically, an adverse increase in communication traffic due to an increase in the data length of the first start message can be avoided.

A sixth aspect of the present invention is related to any one of the second to the fifth aspects of the invention and provides the remote start server of any one of the first to the fifth aspects in which the first start message is transmitted to the communication terminal via a message transmission server (WAP Push GW 2) that transmits a WAP (Wireless Application Protocol) Push message, and the generator notifies the message transmission server of a terminal identifier (terminal ID) for identifying the communication terminal, the first program identifier, the first program starting parameter and the second program starting parameter.

According to the sixth aspect, the first start message can be transmitted to the communication terminal by use of the current WAP Push message, so that costs required for building the system can be reduced.

A seventh aspect of the present invention provides a communication terminal including multiple program execution domains and being instructed by a remote control server to start a start target program. The communication terminal includes a receiver (SMS message processors 511 and 512, and WAP message processors 512 and 522) configured to receive a first start message or requesting the communication terminal to start a switching program that switches a program execution domain to a specific program execution domain for executing the start target program. In the communication terminal the first start message includes a first program identifier or identifying the switching program and a first program starting parameter used by the switching program, and a second program starting parameter used by the start target program. In the communication terminal, the first program starting parameter includes a second program identifier for identifying the start target program, and a domain identifier for identifying the specific program execution domain. In the communication terminal, each of the program execution domains of the communication terminal includes: a reconstructing unit configured to execute the switching program on the basis of the first start message in a case where the first start message is received, and then to reconstruct a second start message for requesting the specific program execution domain to start the start target program; and a starting unit configured to start the execution target program on the basis of the second start message in a case where the second start message is received. In addition, in the communication terminal, the second start message includes the second program identifier and the second program starting parameter.

According to the seventh aspect, it is made possible to provide the communication terminal capable of specifying a program execution domain and of starting a start target program by the specified program execution domain.

An eighth aspect of the present invention is related to the seventh aspect of the invention and provides the communication terminal of the seventh aspect in which the first program starting parameter includes a compression flag indicating whether or not the second program starting parameter has been subjected to compression processing, and the reconstructing unit reconstructs the second start message after performing decompression processing for the second program starting parameter, in a case where the compression flag indicates that the second program starting parameter has been subjected to the compression processing.

According to the eighth aspect, the second program starting parameter is subjected to decompression processing in a case where compression processing is performed for the second program starting parameter for reducing the data length of the second program starting parameter. Thereby, the first start message can store the first program starting parameter without changing the format of the current first start message used by the switching program. Specifically, an adverse increase in communication traffic due to an increase in the data length of the first start message can be avoided.

A ninth aspect of the present invention is related to the eighth aspect of the invention, and provides the communication terminal according to the second aspect in which the reconstructing unit controls the decompression processing in accordance with the second program identifier.

According to the ninth aspect, decompression processing is performed in accordance with the second program identifier for identifying the start target program. The decompression method can be thus changed for each start target program. Since decompression processing appropriate to the start target program can be performed, it is possible to improve the compression rate of the second program starting parameter.

A tenth aspect of the present invention is related to the seventh aspect of the invention and provides the communication terminal according to the seventh aspect in which the first start message stores, in the first start message, location information indicating the location, on the network, of the second program starting parameter as the second program starting parameter, and also stores, in the first program starting parameter, information indicating that the second program starting parameter is the location information. In the communication terminal, the reconstructing unit obtains the actual parameter on the basis of the location information in a case where the information indicating that the second program starting parameter is the location information is stored in the first start message, and reconstructs the second start message from the obtained actual parameter and the second program identifier.

According to the tenth aspect, in a case where location information is stored as the second program starting parameter, by obtaining the actual parameter of the second program starting parameter, the first start message thus can store, without changing the format of the current first start message, the first program starting parameter used by the switching program.

An eleventh aspect of the present invention is related to any one of the seventh to the eleventh aspects and provides the communication terminal according to any one of the seventh to the eleventh aspects in which each of the program execution domains further includes a receiver (one of WAP message processors 512 and 522) configured to receive the first start message by use of a WAP (Wireless Application Protocol) Push message. In addition, in the communication terminal the first program identifier is stored in the message header (WSP header) of the WAP Push message, and the first program starting parameter and the second program starting parameter are stored in the main message content of the WAP Push message.

According to the eleventh aspect, the first start message can be transmitted to the communication terminal by use of the current WAP Push message, so that costs required for building the system can be reduced.

According to the present invention, it is possible to provide a remote start system, a remote start server and a communication terminal that make it possible to specify a program execution domain and to start a start target program by the specified program execution domain, in the remote system using a communication terminal capable of switching multiple program execution domains.

BRIEF DESCRIPTION OF THE DRAWINGS

FIG. 8 is a diagram showing an example of a message transmission request to be notified to a WAP Push GW by the remote start server according to the first embodiment of the present invention.

FIG. 16 is a diagram showing the format of parameters (DM Notification message) for starting a terminal management client program, the format being specified by OMA DM Notification.

FIG. 17 is a diagram showing the format (DM Notification message) of parameters for starting an E-mail client program, the format being specified by OMA DM Notification.

DETAILED DESCRIPTION OF THE INVENTION

Figure 1:
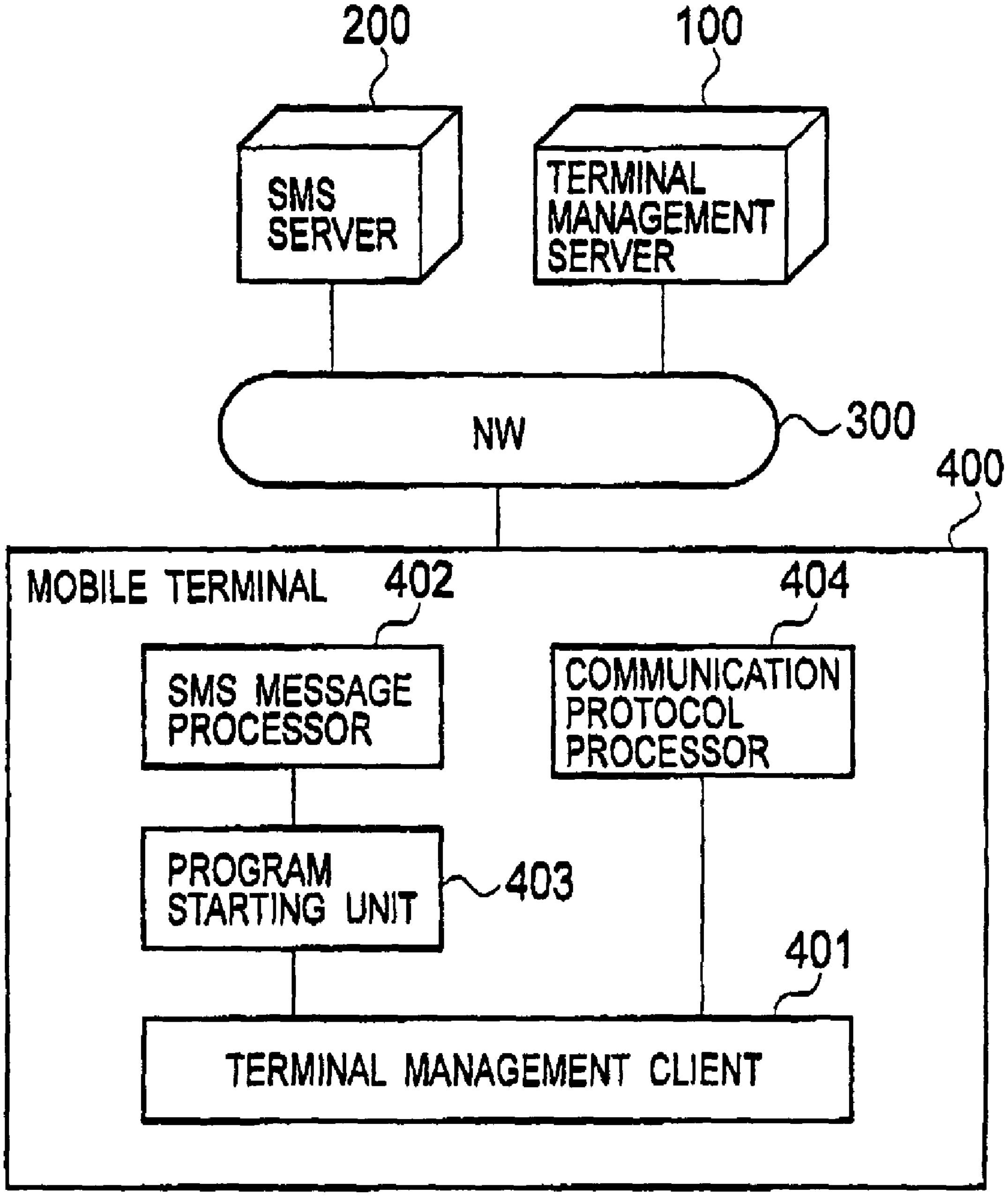
FIG. 1 is a schematic configuration diagram of a terminal management system related to a conventional technique of the present invention.

Hereinafter, referring to drawings, embodiments of the present invention will be described. In the description below for the drawings in the embodiments, the same or similar reference numerals are given to the same or similar portions in the description of the drawings.

First Embodiment

Firstly, referring to FIGS. 2 to 10, a description will be given of a configuration of a remote start system according to a first embodiment.

(Overall Schematic Configuration of Remote Start System)

Figure 2:
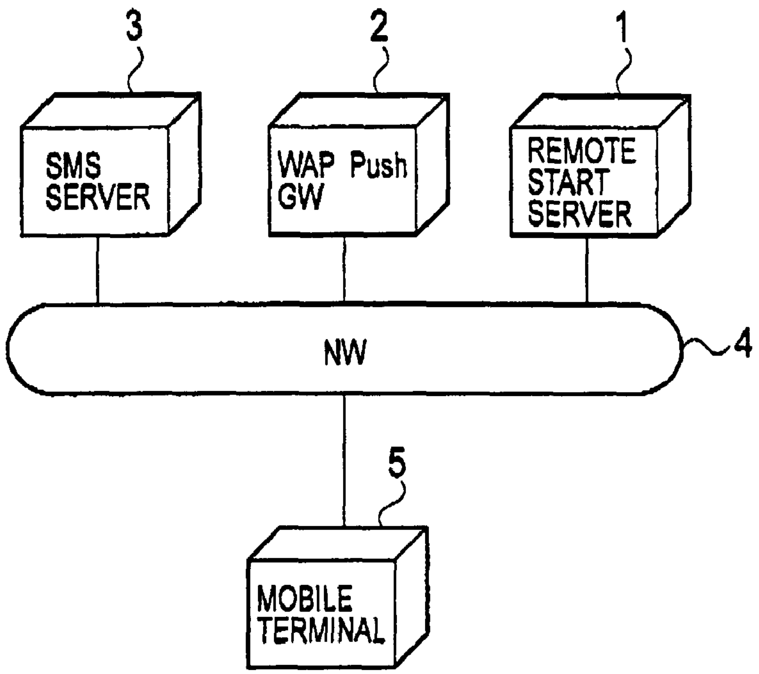
FIG. 2 is a diagram showing an overall schematic configuration of a remote start system according to a first embodiment of the present invention.

FIG. 2 is a diagram showing an overall schematic configuration diagram of the remote start system according to the first embodiment. The remote start system according to this embodiment includes a remote start server 1, a WAP Push GW (gateway) 2, an SMS server 3, an NW 4 and a mobile terminal 5.

Each of the remote start server 1, the WAP Push GW 2, the SMS server 3, the NW 4 and the mobile terminal 5 is provided with hardware resources such as a CPU, a storage device, an input/output device and the like, and software resources stored in the storage device.

The mobile terminal 5 is, for example, a mobile phone terminal or a notebook PC or the like including a radio communication function. The mobile terminal 5 is provided with multiple aforementioned program execution domains.

The remote start server 1 specifies a start target program and generates a start message, thereby remotely starting a start target program on the mobile terminal 5.

Here, for the purpose of switching a program execution domain of the mobile terminal 5 to a specific program execution domain capable of executing the start target program, the remote start server 1 specifies a switching program previously provided in the mobile terminal 5 and then generates a start message.

In the start message, a switching program ID used for identifying the switching program, a start target program ID used for identifying the start target program and a domain ID used for identifying the specific program execution domain capable of executing the start target program are stored.

In addition, the remote start server 1 requests the WAP Push GW 2 to transmit a WAP Push message to the mobile terminal.

The WAP Push GW 2 generates a WAP Push message in response to the request issued from the remote server 1, and then requests the SMS server 200 to transmit the generated WAP Push message to the mobile terminal 5.

In response to the request issued from the WAP Push GW 2, the SMS server 3 transmits an SMS message including the WAP Push message stored therein to the mobile terminal 5 via the NW 4. It should be noted that the NW 4 is formed by the internet and a mobile communication network, for example.

The mobile terminal 5 receives the SMS message via the NW 4, and in accordance with the WAP Push message stored in the SMS message, starts the program specified by the remote start server 1, that is, the switching program.

Then, the mobile terminal 5 starts the start target program after switching a program execution domain to the specific program execution domain by use of the start target program ID and the domain ID that is stored in the WAP Push message.

(Configuration of Remote Start Server)

Figure 3:
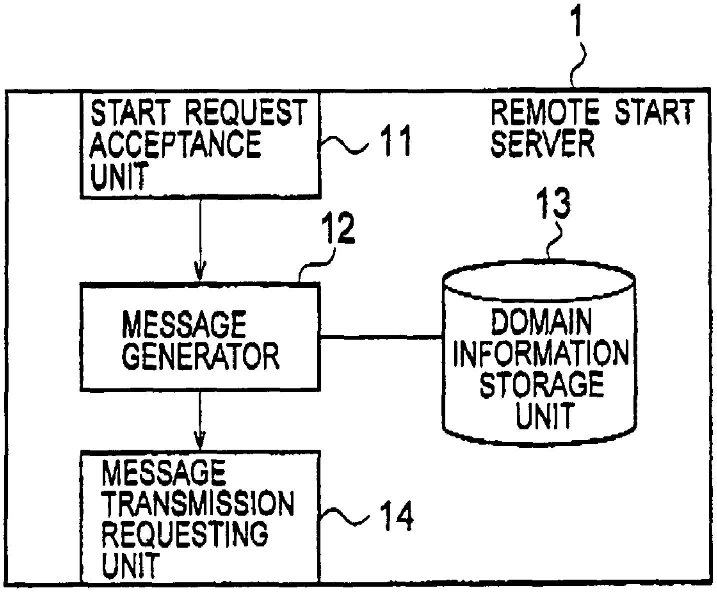
FIG. 3 is a functional block diagram showing a configuration of a remote start server according to the first embodiment of the present invention.

FIG. 3 is a functional block diagram showing a configuration of the remote start server 1. The remote start server 1 includes a start request acceptance unit 11, a message generator 12, a domain information storage unit 13 and a message transmission requesting unit 14.

The start request acceptance unit 11 accepts a start request from a user terminal (not shown). This start request is a request issued for the mobile terminal 5 to start a start target program. In addition, a target program ID, a user ID and the like is stored in the start request.

The domain information storage unit 13 stores the user ID stored in the start request and the domain ID of a program execution domain capable of being remotely started by the user, while associating the user ID and the domain ID with each other.

In response to the start request accepted by the start request acceptance unit 11, the message generator 12 generates a switching program start message for starting a switching program of the mobile terminal 5. Specifically, the message generator 12 obtains the domain ID corresponding to the user ID included in the start request, and generates the switching program start message on the basis of the obtained domain ID.

The message transmission request unit 14 requests the WAP Push GW 2 to transmit the switching program start message.

(Configuration of Mobile Terminal)

Figure 4:
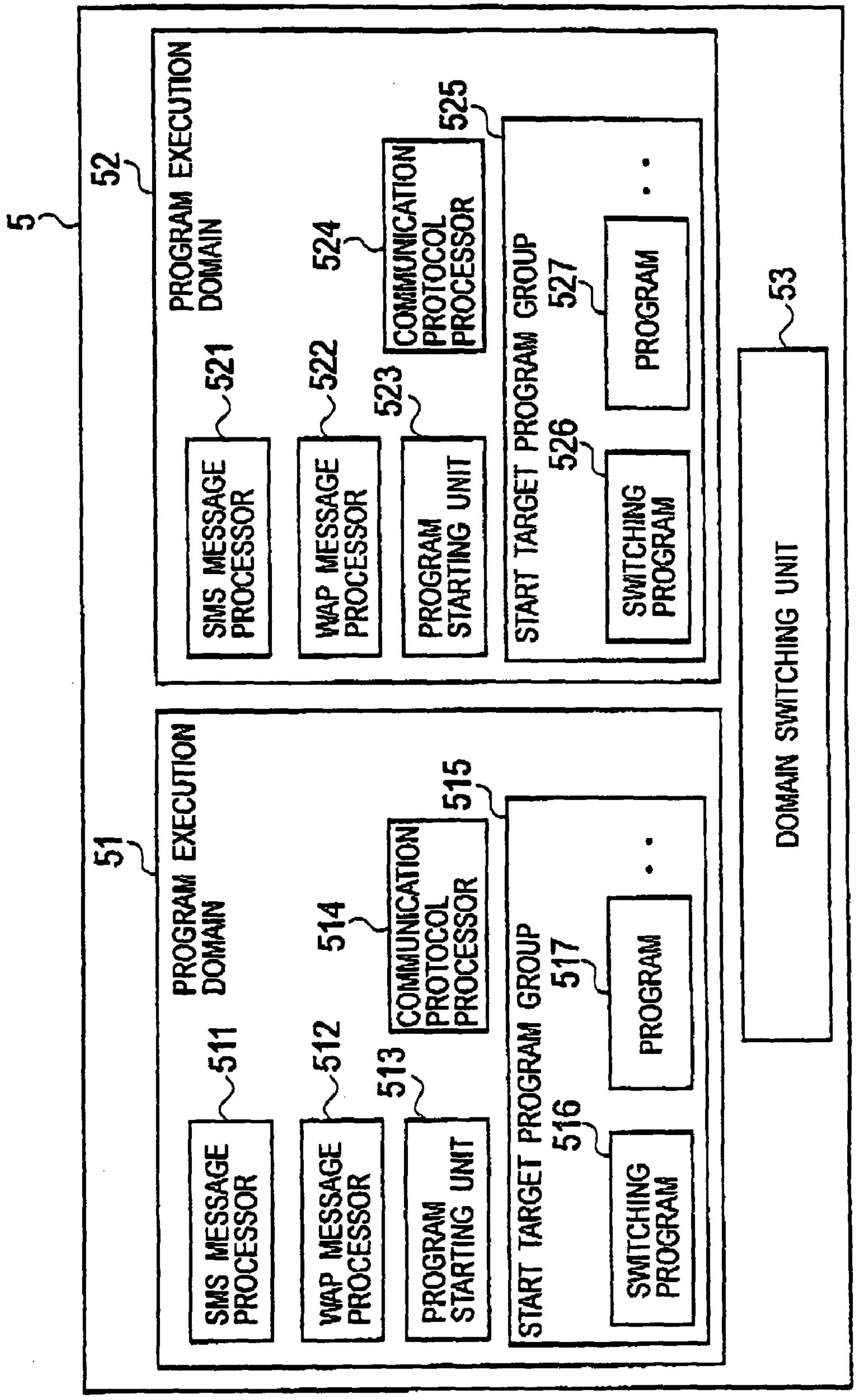
FIG. 4 is a functional block diagram showing a configuration of a mobile terminal according to the first embodiment of the present invention.

FIG. 4 is a functional block diagram showing a configuration of the mobile terminal 5. The mobile terminal 5 includes program execution domains 51 and 52, and a domain switching unit 53.

The program execution domains 51 and 52 are program execution domains each executing a program having a different attribution (real-time executability, reliability, administrator or the like). Here, it is assumed in the present embodiment that the administrators of the program domains 51 and 52 are different.

The program execution domain 51 includes an SMS message processor 511, a WAP message processor 512, a program starting unit 513, a communication protocol processor 514 and a start target program group 515. As to the program execution domain 52, since the configuration of the program execution domain 52 is the same as that of the program execution domain 51, descriptions of the respective function blocks of the program execution domain 52 are omitted here.

The SMS message processor 511 processes an SMS message received from the NW 4 and extracts a WAP Push message from the SMS message. The extracted WAP Push message is inputted to the WAP message processor 512.

The communication protocol processor 514 processes various types of communication protocols such as an HTTP, a TCP and an IP.

The WAP message processor 512 processes the WAP Push message and extracts a program ID (switching program ID or start target program ID) stored in the WAP Push message header.

The program start unit 513 starts the program indicated by the program ID extracted by the WAP message processor 512. It should be noted that the main content (message body) of the WAP Push message (program starting parameters) is inputted to the program start unit 513.

The start target program group 515 includes a switching program 516, and programs 517. The programs 517 are programs including a terminal management client program, an E-mail client program and the like, for example.

The switch program 516 reconstructs the start target program start message for starting the start target program. In addition, the switching program 516 issues a domain switch request to the domain switching unit 53.

In accordance with the domain switch request from the program execution domain 51, the domain switching unit 53 switches the program execution domain 51 to the program execution domain 52. In addition, in accordance with the domain switch request from the program execution domain 52, the domain switching unit 53 switches the program execution domain 52 to the program execution domain 51.

(Configuration Example of Program Execution Domain)

Next, a description will be given of a configuration example of multiple program execution domains. Each of the program execution domains is a virtual program execution system (program execution environment) that operates on a single mobile terminal 5.

Figure 5:
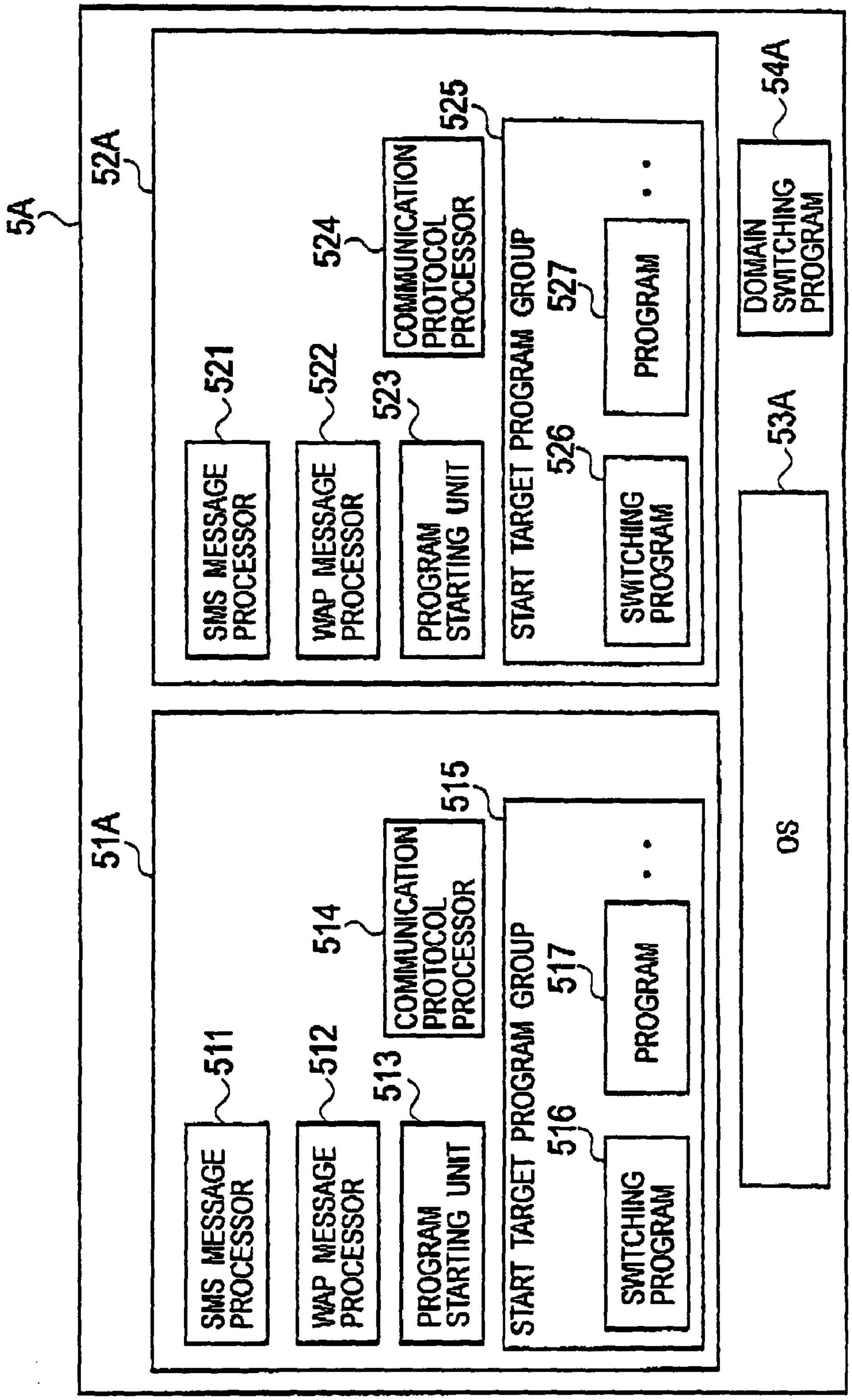
FIG. 5 is a functional block diagram showing a configuration example 1 of multiple program execution domains according to the first embodiment of the present invention.

FIG. 5 is a functional block diagram showing a configuration example 1 of the multiple program execution domains. A mobile terminal 5A shown in FIG. 5 includes a single OS 53A. The mobile terminal 5A forms multiple program execution domains 51A and 52A by executing a domain switching program 54 on the OS 53A. In the configuration example 1, unless one of the domains is switched to the other, only any one of the program execution domains 51A and 52A operates, and the other is in a stopped state.

Figure 6:
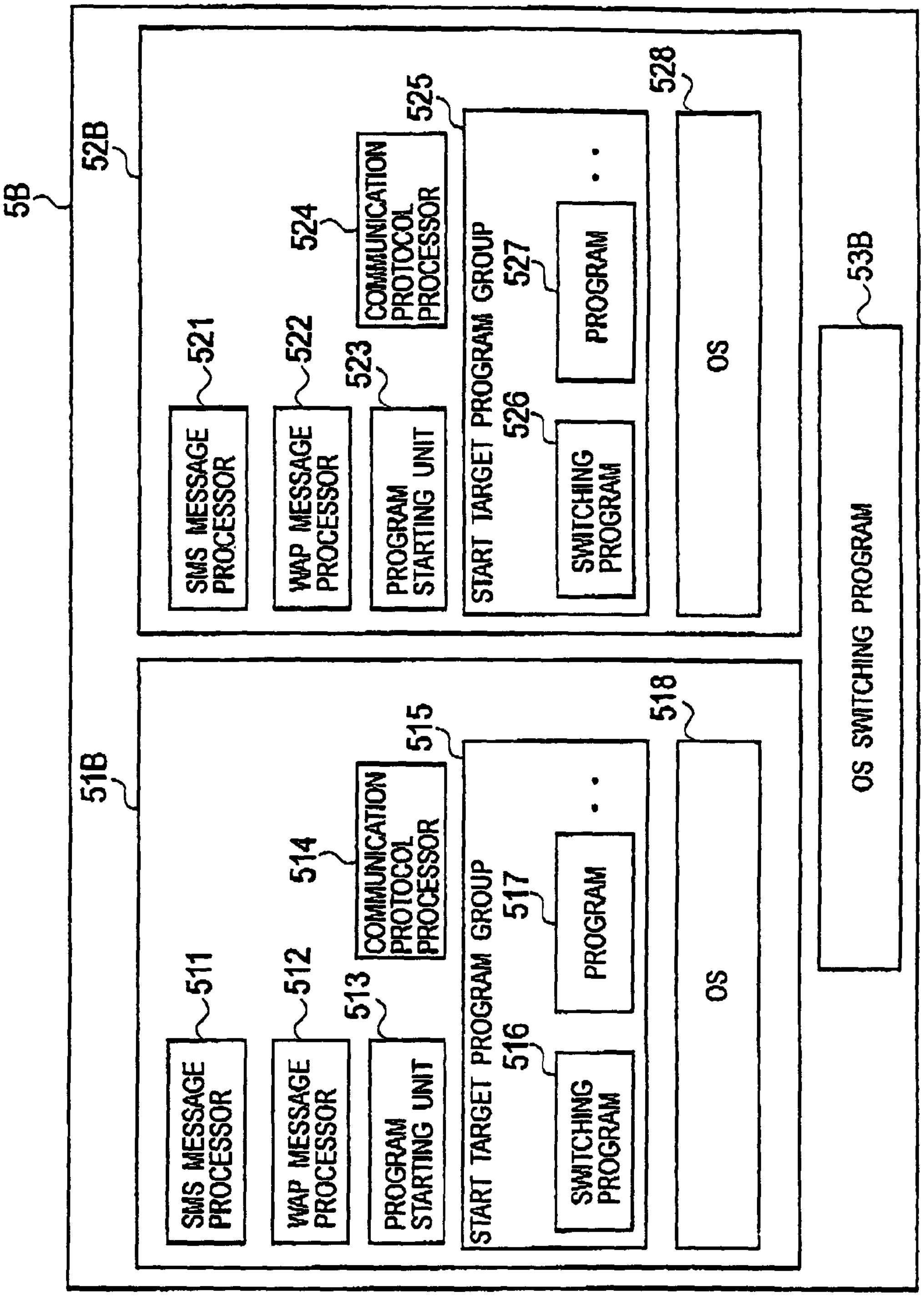
FIG. 6 is a functional block diagram showing a configuration example 2 of multiple program execution domains according to the first embodiment of the present invention.

FIG. 6 is a functional block diagram showing a configuration example 2 of multiple program execution domains. A mobile terminal 5B shown in FIG. 6 includes multiple OSes 518 and 528. The mobile terminal 5B form multiple program execution domains 5B and 52B by executing an OS switching program 53B respectively on the OSes 518 and 528. In the configuration example 2 as well unless one of the domains is switched to the other, only any one of the program execution domains 51B and 52B operates, and the other is in a stopped state.

Figure 7:
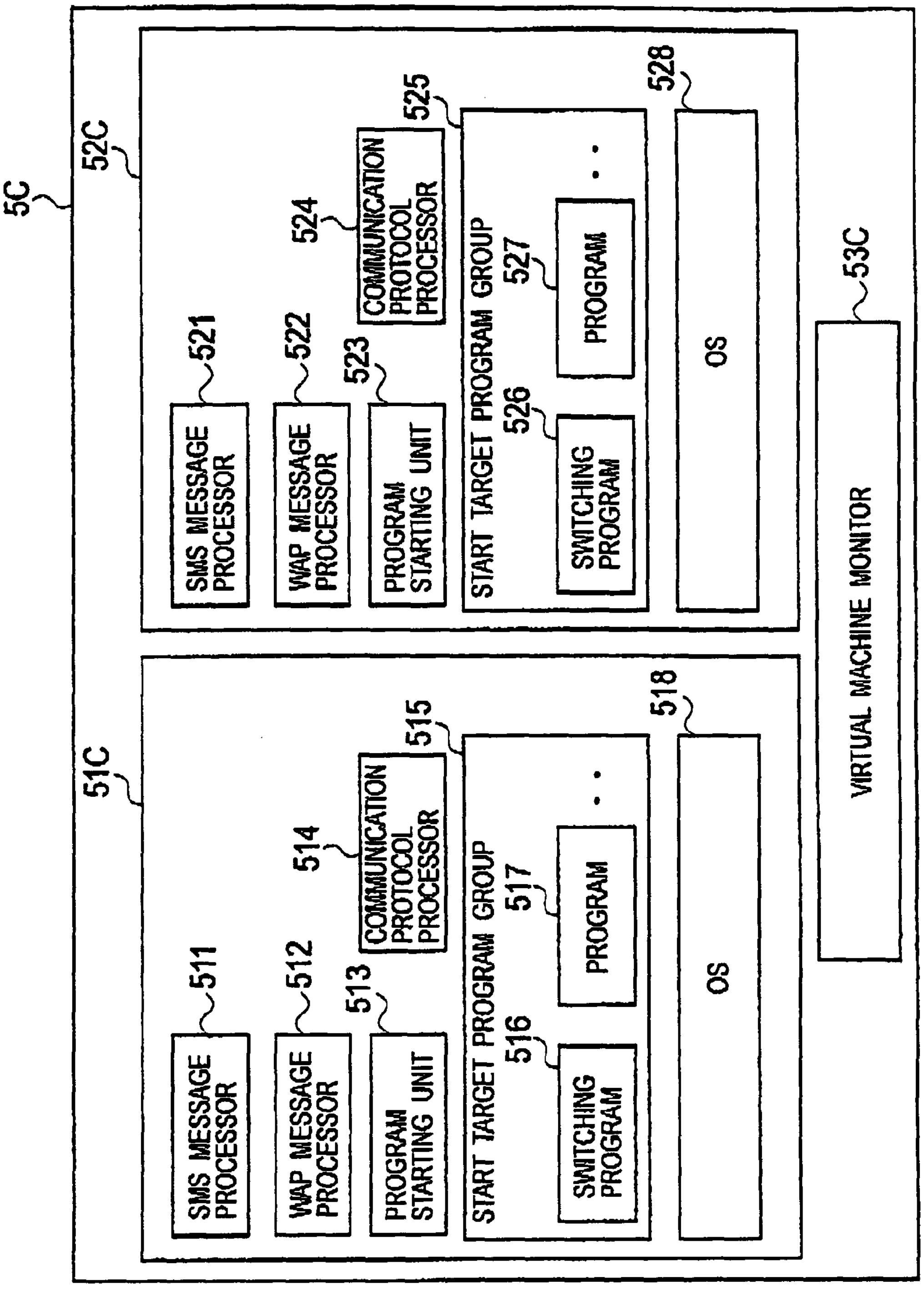
FIG. 7 is a functional block diagram showing a configuration example 3 of multiple program execution domains according to the first embodiment of the present invention.

FIG. 7 is a functional block diagram showing a configuration example 3 of multiple program execution domains. A mobile terminal 5C shown in FIG. 7 includes the multiple OSes 518 and 528. The mobile terminal 5C forms multiple program execution domains 51C and 52C by a virtual machine monitor 53C that manages the multiple OSes 518 and 519. In the configuration example 3, both of the program execution domains 51C and 52C operate at the same time.

(Example of Message Transmission Request)

FIG. 8 is a diagram showing an example of a message transmission request to be notified to the WAP Push GW 2 by the remote start server 1. As shown in FIG. 8, the remote start server 1 generates a message transmission request as an HTTP Post message.

In FIG. 8, the terminal ID (phone number, for example) of the mobile terminal 5 is described between the tags <msn> and </msn>. A switching program ID is described between the tags <programid> and <programid>. In addition, program starting parameters (parameters for starting the switching program and the start target program) are described between the tags <programparam> and </programparam>.

(Example of Switching Program Start Message)

Figure 9:
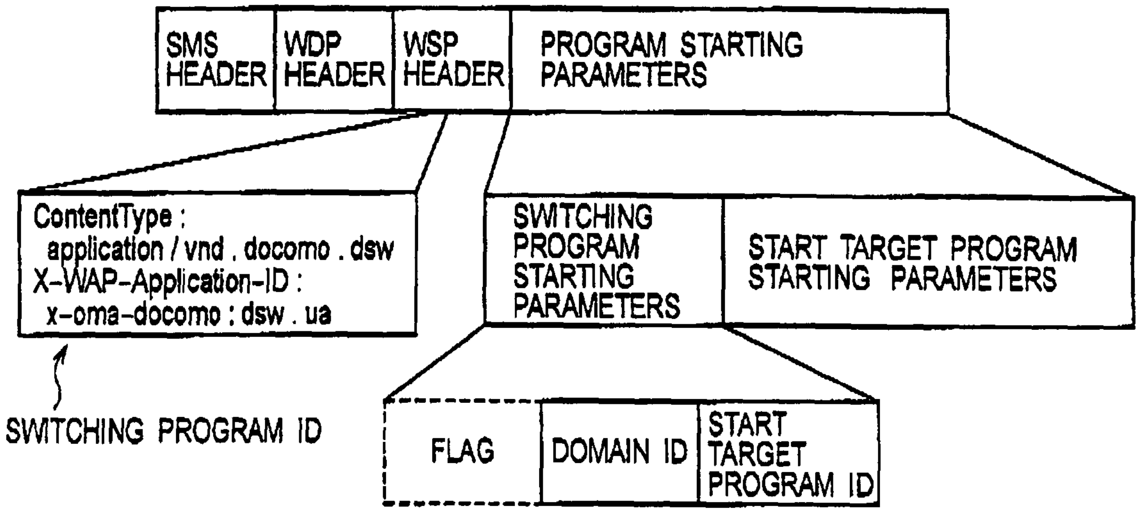
FIG. 9 is a diagram showing a configuration example of an SMS message transmitted to the mobile terminal from an SMS sever according to the first embodiment of the present invention.

FIG. 9 is a diagram showing a configuration example of an SMS message transmitted to the mobile terminal 5 from the SMS server 3. As shown in FIG. 9, the SMS message is composed of an SMS header, a wireless datagram protocol (WDP) header, a wireless session protocol (WSP) header and the main content (program starting parameters) of a WAP message.

A switching program ID is stored in the WSP (wireless session protocol) header.

The switching program starting parameters and a start target program are stored in the main content of the message.

Furthermore, the switch program starting parameters includes a start target program ID, a domain ID and various types of flags to be described later.

As described above, the switching program start message is configured in a manner that a start target program start message is capsulated in the switching program start message.

(Example of Start Target Program Start Message)

Figure 10:
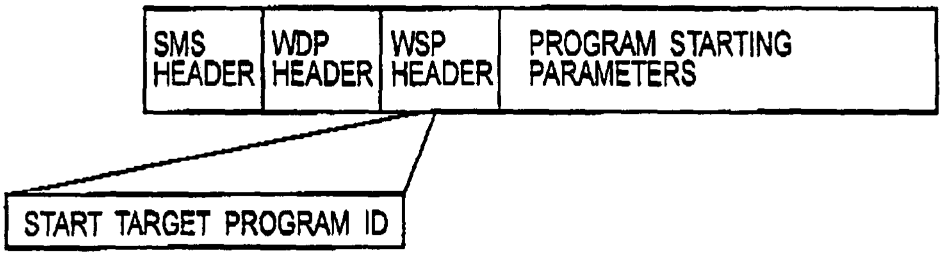
FIG. 10 is a diagram showing a configuration example of an SMS message reconstructed by the mobile terminal according to the first embodiment of the present invention.

FIG. 10 is a diagram showing a configuration example of an SMS message that is to be reconstructed by the aforementioned switching program. The start target program start message is composed of an SMS header, a WDP header, a WSP header and the main content of the message in a similar manner in the example shown in FIG. 9.

A start target program ID is stored in the WSP header. The start target program starting parameters are stored in the main content of the message.

As shown in FIGS. 9 and 10, the switching program start message and the start target program start message are configured in the same format. Accordingly, the existing program start message processing can be utilized in each of the program execution domains 51 and 52.

(Operation of Remote Start System)

Next, referring to FIGS. 11 to 13, a description will be given of an operation of the aforementioned remote start system.

Figure 11:
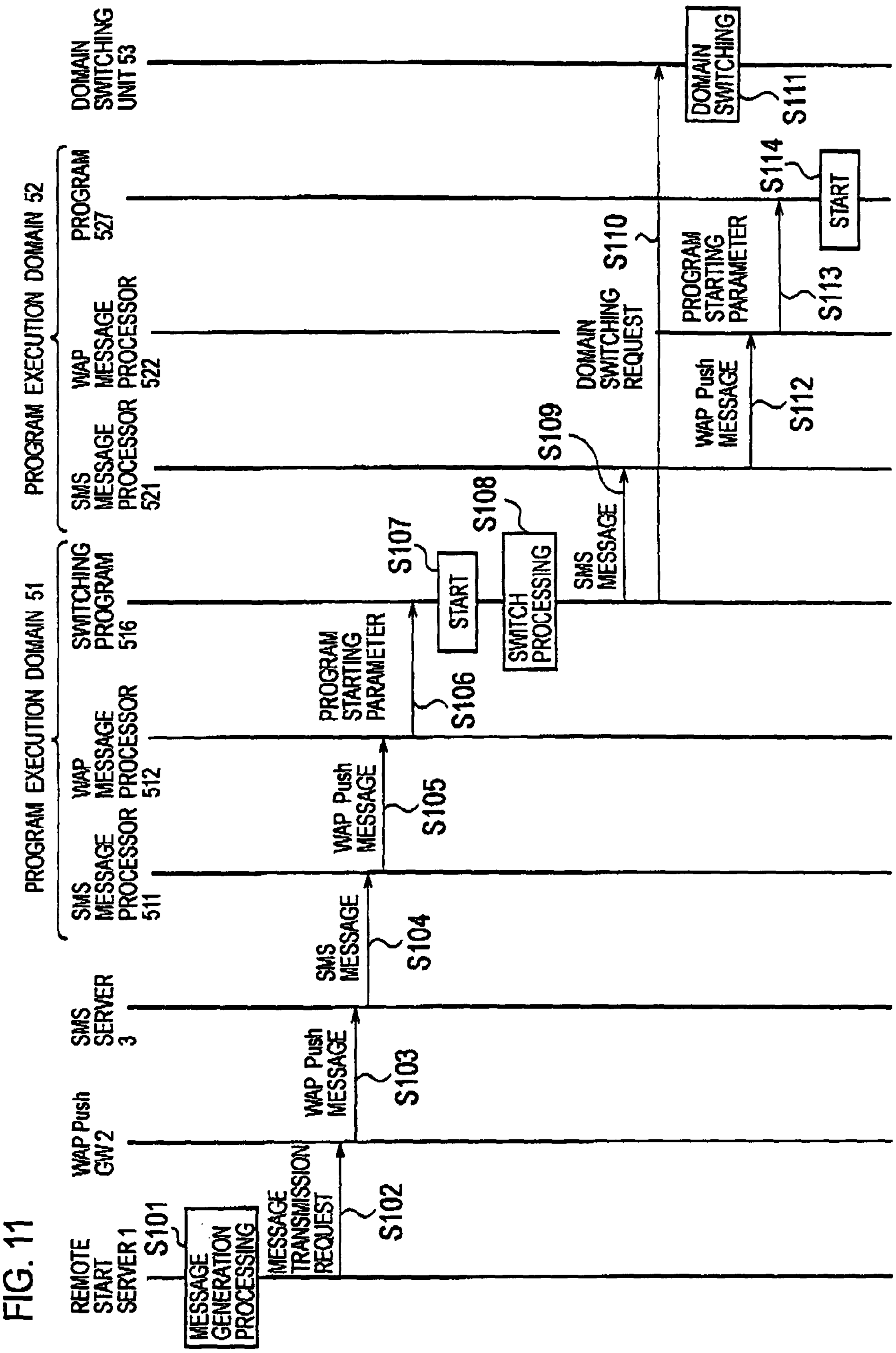
FIG. 11 is a sequence diagram showing an overview of an entire operation of the remote start system according to the first embodiment of the present invention.

FIG. 11 is a sequence diagram showing an overall schematic operation of the remote start system. Here, a description will be given of a case where the mobile terminal 5 starts the program 527 of the program execution domain 51 while another program is in execution by the program execution domain 51. In other words, the program 527 is the start target program in this case.

In step S101, the remote start server 1 generates a switching program start message. In the switching program start message, a terminal ID of the mobile terminal 5, a switching program ID and switching program starting parameters are stored. Furthermore, in the switching program starting parameters, a program ID of the program 527, a domain ID of the program execution domain 52 and parameters for starting the program 527 are stored. Incidentally, detailed descriptions of step S101 will be given later.

In step S102, the remote server 1 notifies the WAP Push OW 2 of a transmission request or the switching program start message generated in step S101.

In step S103, the WAP Push GW 2 transmits a WAP Push message to the SMS server 200 in accordance with the message transmission request notified in step S102.

In step S104, in accordance with the format shown in FIG. 9, the SMS server 3 transmits an SMS message including the WAP Push message received in step S103 stored therein to the mobile terminal 5. The SMS message is received by the SMS message processor 511 of the program execution domain 51.

In step S105, the SMS message processor 511 extracts the WAP Push message from the SMS message received in step S104, and transmits the extracted WAP Push message to the WAP message processor 512.

In step S106, the WAP message processor 512 transmits, on the basis of the switching program ID stored in the message header of the WAP Push message extracted in step S105, the main content message (program starting parameters) of the WAP Push message to the switching program 516. Furthermore, the program starting unit 513 (not shown in FIG. 1, refer to FIG. 4) starts the switching program 516.

In step S107, the switching program 516 is started.

In step S108, the switching program 516 executes, on the basis of the switching program sting parameters, received in step S106, the processing for switching the program execution domain to the program execution domain 52. The switching program 516 reconstructs the SMS message in accordance with the format shown in FIG. 10. Detailed descriptions of step S108 will be given later in this description.

In step S109, the switching program 516 transmits the SMS message reconstructed in step S108 to the program execution domain 52. The SMS message is received by the SMS message processor 521 of the program execution domain 52.

In step S110, the switching program 516 requests the domain switching unit 53 to switch the program execution domain to the program execution domain 52.

In step S111, the domain switching unit 53 executes the processing for switching the program execution domain 51 to the program execution domain 52.

In step S112, the SMS message processor 521 extracts the WAP Push message from the SMS message received in step S109, and transmits the extracted WAP Push message to the WAP message processor 522.

In step S113, the WAP message processor 522 transmits the main content message (program starting parameters) of the WAP Push message to the start target program 527 on the basis of the execution target program ID stored in the message header of the WAP Push message extracted in step S112. In addition, the program starting unit 523 (not shown in FIG. 11, refer to FIG. 4) starts the start target program 527.

In step S114, the start target program 527 is started. Specifically, the start target program 527 performs start processing by use of the start target program starting parameters, the parameters being received in step S113.

(Operation of Remote Start Server)

Figure 12:
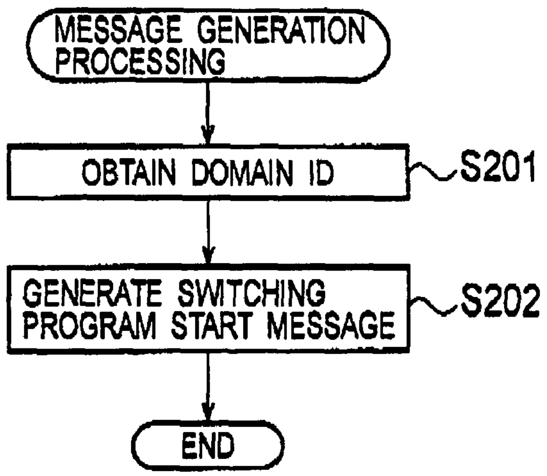
FIG. 12 is a flowchart showing detailed operations of the remote start server according to the first embodiment of the present invention.

FIG. 12 is a flowchart showing the detailed operation of the message generator 12 of the remote start server 1.

In step S201, the message generator 12 of the remote start sever 1 obtains, from the domain information storage unit 13, a domain ID corresponding to the user ID included in the start request.

In step S202, the message generator 12 generates a switching program start message on the basis of the domain ID obtained in step S201.

(Operation of Mobile Terminal)

Figure 13:
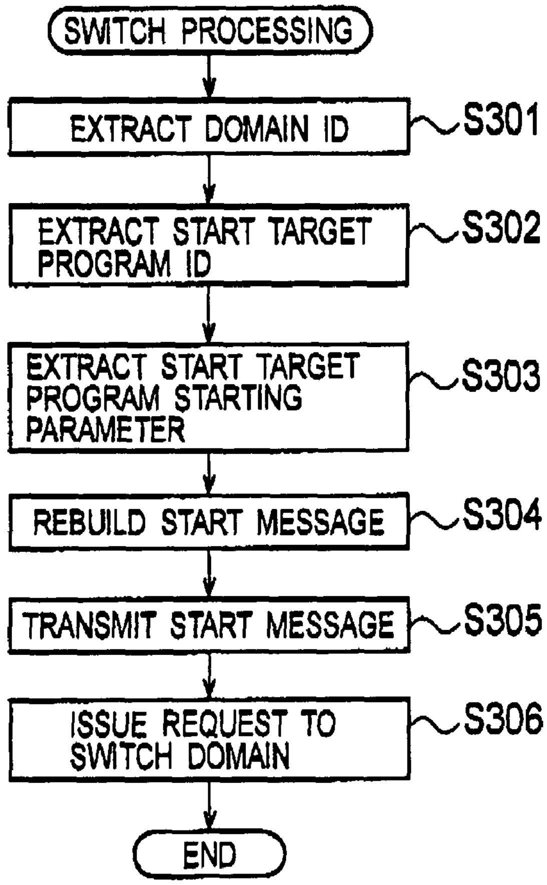
FIG. 13 is a flowchart showing detailed operations of the mobile terminal according to the first embodiment of the present invention.

FIG. 13 is a flowchart showing the detailed operation of the switching program 516 of the mobile terminal 5.

In step S301, the switching program 516 of the mobile terminal 5 extracts the domain ID stored in the switching program starting parameters.

In step S302, the switching program 516 extracts the start target program ID stored in the parameters for starting the switch program. In step S303, the switching program 516 extracts the start target program starting parameters from the program starting parameters.

In step S304, the switching program 516 reconstructs the start target program start message from the domain ID, the start target program ID and the start target program starting parameters respectively extracted in steps S301 to S303.

In step S305, the switching program 516 transmits the start target program start message reconstructed in step S304 to the program execution domain 52.

In step S306, the switching program 516 requests the program switching unit 53 to switch the program execution domain to the program execution domain 52.

(Effects and Advantages)

As described above in details, according to the present embodiment, the remote start server 1 generates a switching program start message for requesting the starting of the switching program 516 for switching the program execution domain to the program execution domain 52 that executes the start target program 527. In a case where the mobile terminal 5 receives the switching program start message, the mobile terminal 5 executes the switching program 516 on the basis of the switching program start message, and reconstructs a start target program start message for requesting the program execution domain 52 to start the start target program 527.

Accordingly, the start target program 527 can be started by switching the program execution domain 51 to the program execution domain 52 in the mobile terminal 5. In addition, the start target program 527 can be started by the program execution domain 52 corresponding to the administrator who has remotely requested the starting of the program.

Second Embodiment

A description will be given of a configuration used in performing compression processing for start target program starting parameters in a second embodiment of the present invention.

The amount of data of the start target program starting parameters is reduced by deleting, from a switching program start message, a field whose value can be regarded as an approximately constant value such as version information or a reserved field in the start target program starting parameters.

In the mobile terminal 5, such compression processing is specified for each start target program, and the information on the compression processing is shared by the remote start server 1 and the mobile terminal 5. Accordingly, decompression processing corresponding to the compression processing can be executed.

In addition, in this embodiment, a compression flag indicating whether or not start target program starting parameters have been subjected to compression processing is stored in a flag area shown in FIG. 9.

It should be noted that in this embodiment, a description will be mainly given as to points that are different from those of the aforementioned first embodiment, and the descriptions of the overlapping portions of the embodiments will be omitted here.

(Configuration of Remote Start Server)

Figure 14:
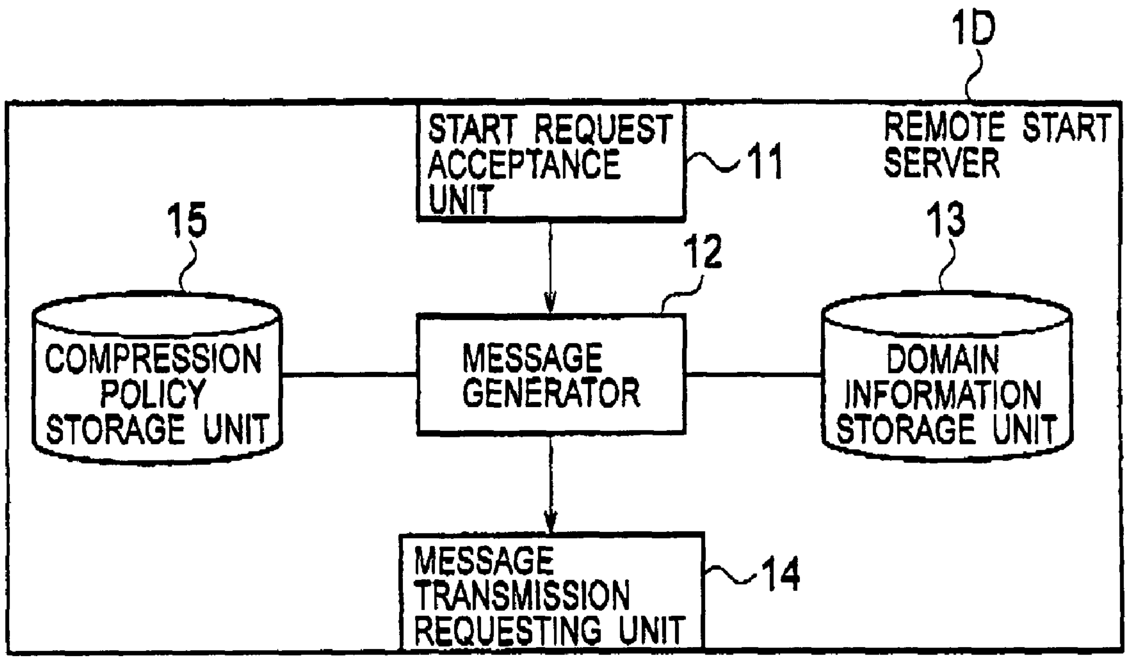
FIG. 14 is a functional block diagram showing a configuration of a remote start server according to a second embodiment of the present invention.

FIG. 14 is a functional block diagram showing a configuration of a remote start server ID according to the second embodiment.

The remote start server ID according to the present embodiment is different from that of the aforementioned first embodiment in that the remote start server ID is provided with a compression policy storage unit 15. The compression policy storage unit 15 stores the program IDs of start target programs and compression policies each indicating the content of compression processing while associating the program IDs and the compression policies with each other.

In a case where the data length of start target program starting parameters is greater than a specified value, the message generator 12 performs compression processing for the start target program starting parameters, and also sets the compression flag to indicate that the compression processing has been performed for the parameters.

Specifically, the message generator 12 obtains a compression policy corresponding to the start target program ID from the compression policy storage unit 15 and then executes compression processing in accordance with the obtained compression policy.

(Configuration of Mobile Terminal)

Figure 15:
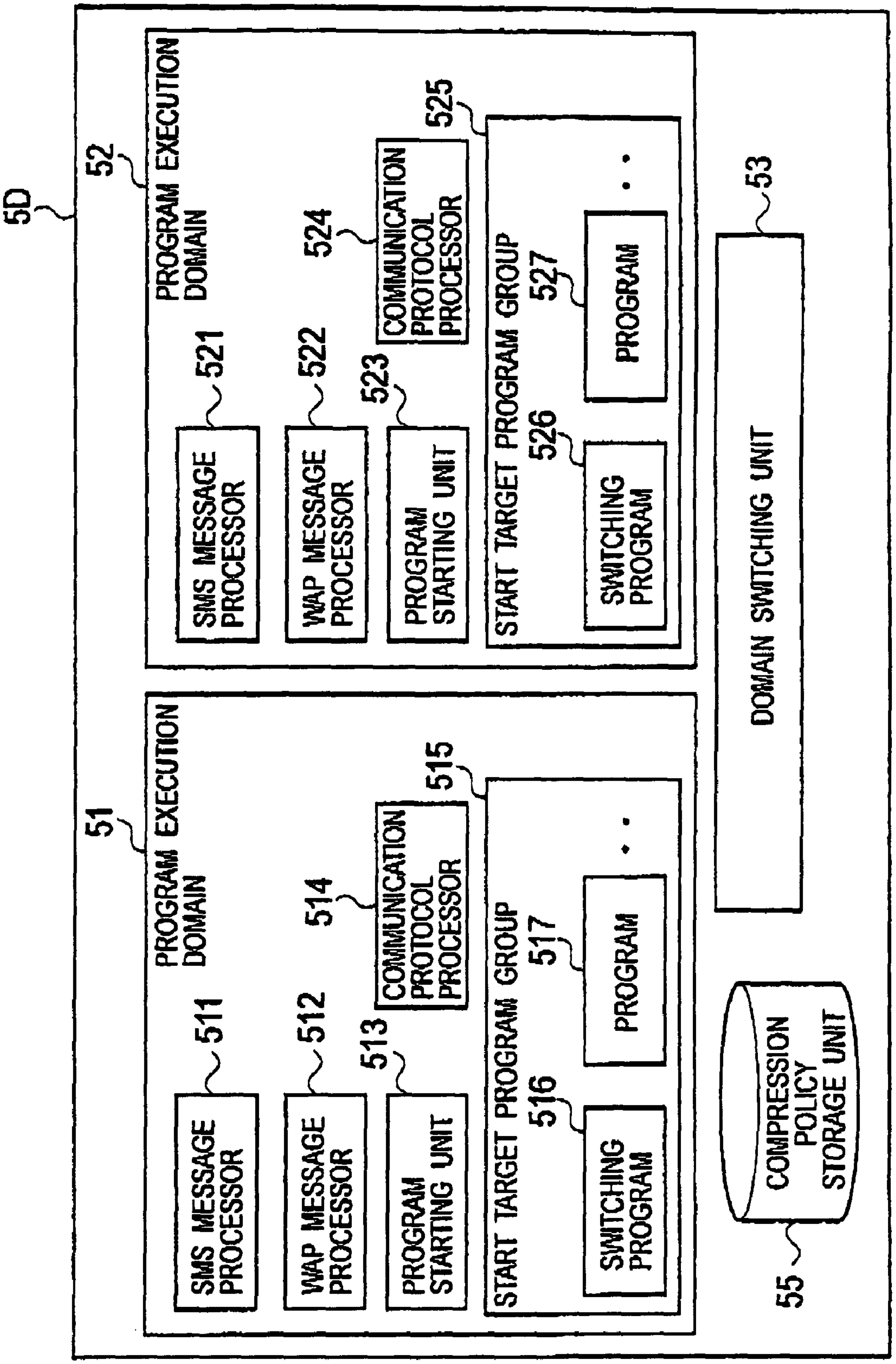
FIG. 15 is a functional block diagram showing a configuration of a mobile terminal according to the second embodiment of the present invention.

FIG. 15 is a functional block diagram showing a configuration of a mobile terminal 5D according to the present embodiment.

The mobile terminal 5D according to the present embodiment is different from that of the aforementioned first embodiment in that the mobile terminal 5D is provided with a compression policy storage unit 55. The compression policy storage unit 55 stores the program IDs of start target programs and compression policies each indicating the content of compression processing while associating the program IDs and the compression policies with each other.

In a case where a compression flag indicates that the parameters have been subjected to compression processing, one of the switching programs 516 and 526 reconstructs the start target program start message after performing decompression processing for the start target program starting parameters.

The corresponding one of the switching programs 516 and 526 obtains a compression policy corresponding to the start target program ID from the compression policy storage unit 55 and executes decompression processing in accordance with the obtained compression policy.

Compression Processing Example 1

A description will be given as to the case of subjecting parameters for starting a terminal management client program, in a case where the start target program is the terminal management client program.

FIG. 16 is a diagram showing the format of parameters (DM Notification message) for starting the terminal management client program the format specified by OMA DM Notification. In the parameters shown in FIG. 16, the "version" field of 10 bits and the "future-use" field of 27 bits can be regarded as constant values for each terminal management client implementation. Accordingly, these parameters can be deleted. Thereby, the amount of data of 37 bits can be deleted.

Compression Processing Example 2

As a compression processing example 2, a description will be given as to the case of subjecting parameters for starting an e-mail client program in a case where the start target program is the e-mail client program.

FIG. 17 is a diagram showing the format of parameters (DM Notification message) for starting the e-mail client program, the format being specified by OMA DM Notification. In the parameters shown in FIG. 17, the values in the first three fields can be regarded as constant values for each terminal management client implementation. Accordingly, these values can be deleted. Thereby, the amount of data of 24 bits can be deleted.

(Operation of Remote Start Server)

Figure 18:
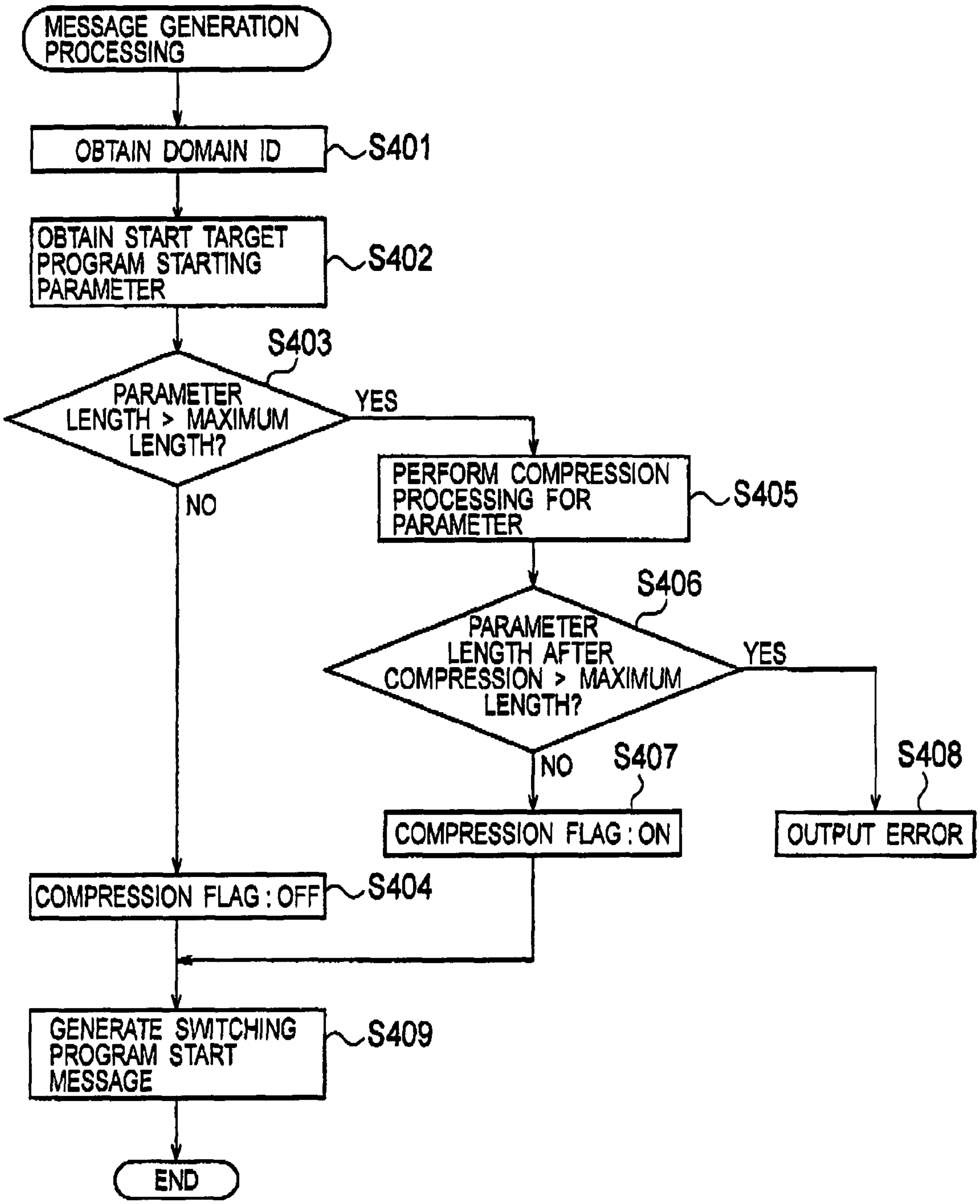
FIG. 18 is a flowchart showing an operation of the remote start server according to the second embodiment of the present invention.

FIG. 18 is a flowchart showing an operation of the remote start server 1 according to the present embodiment.

In step S401, the message generator 12 obtains a domain ID corresponding to the user ID included in the start request from the domain information storage unit 13. Moreover, the message generator 12 obtains a start target program ID.

In step S402, the message generator 12 obtains start target program starting parameters.

In step S403, the message generator 12 determines whether or not the data length of the start target program starting parameters, the parameters being obtained in step S402, exceeds the maximum length. In a case where the data length of the start target program starting parameters is determined to be not greater than the maximum length, the operation proceeds to the processing in step S404. On the other hand, in a case where it is determined that the data length of the start target program starting parameters exceeds the maximum length the operation proceeds to the processing in step S405.

In step S404, the message generator 12 sets the compression flag to OFF.

In step S405, the message generator 12 executes compression processing for the start target program starting parameters, the parameters being obtained in step S402.

In step S406, the message generator 12 determines whether or not the data length of the start target program starting parameters, the parameters being compressed in step S405, exceeds the maximum length. In a case where the data length of the start target program starting parameters is determined to be not greater than the maximum length, the operation proceeds to the processing in step S407. On the other hand, in a case where it is determined that the data length of the start target program starting parameters exceeds the maximum length, the operation proceeds to the processing in step S408, and then, the processing for outputting an error is performed.

In step S407, the message generator 12 sets the compression flag to ON.

In step S409, the message generator 12 generates a switching program start message.

(Operation of Mobile Terminal)

Figure 19:
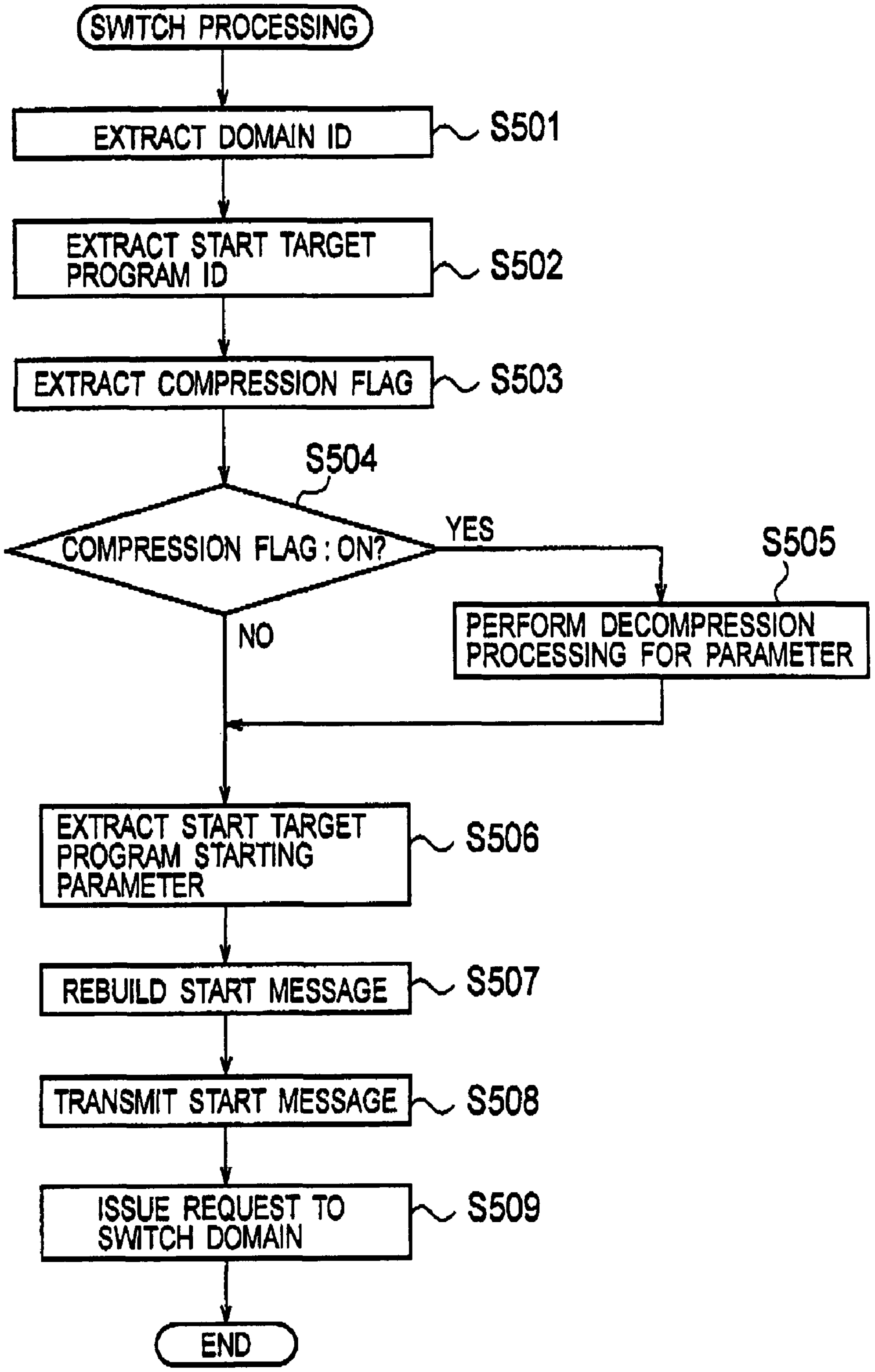
FIG. 19 is a flowchart showing an operation of the mobile terminal according to the second embodiment of the present invention.

FIG. 19 is a flowchart showing an operation of the mobile terminal 5D according to the present embodiment. Here, a description will be given of the switching program 516 of the mobile terminal 5D as an example.

In step S501, the switching program 516 of the mobile terminal 5D extracts the domain ID stored in the switching program starting parameters.

In step S502, the switching program 516 extracts the start target program ID stored in the switching program starting parameters.

In step S503, the switching program 516 extracts the compression flag stored in the switching program starting parameters.

In step S504, the switching program 516 determines whether or not the compression flag extracted in step S505 is ON. In a case where the compression flag is determined to be ON, the operation proceeds to the processing in step S505. On the other hand, in a case where the compression flag is determined to be OFF, the operation proceeds to the processing in step S506.

In step S505, the switching program 516 executes decompression processing for the start target program starting parameters.

The processing in respective steps S506 to S509 is the same as the processing in respective steps S303 to S306. Accordingly, the descriptions of the overlapping portions are omitted here.

(Effects and Advantages)

According to the present embodiment, in a case where the data length of the start target program starting parameters is greater than a specified value, the start target program starting parameters are subjected to compression processing. Accordingly, it is made possible to avoid an adverse increase in communication traffic and communication costs (distribution costs of SMS) due to an increase in the data length of the switching program start message.

In addition, a compression method is changed to another for each start target program. Thereby, the parameters for starting a second program can be efficiently compressed.

Third Embodiment

In a third embodiment of the present invention, a description will be mainly given as to points that are different from the aforementioned first embodiment, and the descriptions of the overlapping portions of the two embodiments will be omitted here.

(Overall Schematic Configuration of Remote Start System)

Figure 20:
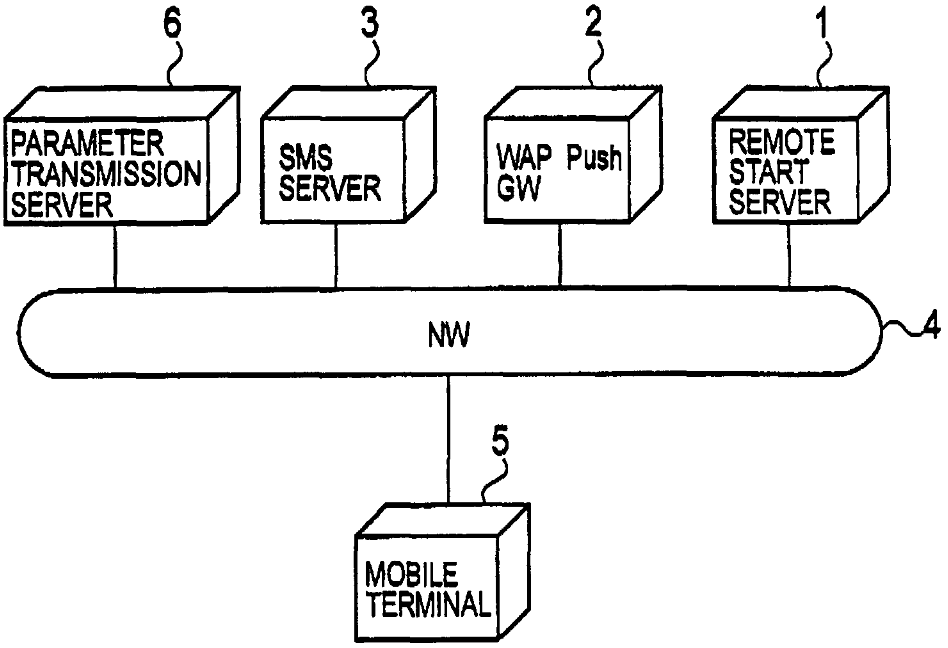
FIG. 20 is a diagram showing an overall schematic configuration of a remote start system according to a third embodiment of the present invention.

FIG. 20 is a diagram showing an overall schematic configuration of a remote start system according to the third embodiment. The remote start system according to the present embodiment is different from that of the aforementioned first embodiment in that the remote start system according to the present embodiment includes a parameter transmission server 6.

The parameter transmission server 6 retains actual parameters for starting start target programs and transmits the actual start target program starting parameters to the mobile terminal 5 in response to a transmission request from the mobile terminal 5.

In addition, the remote start server 1 stores, in a switching program start message, URI information indicating a location of the start target program starting parameters on the NW 4, as the start target program starting parameters. The remote start server 1 also stores, in the switching program starting parameters, information indicating that the start target program starting parameters is the URI information.

Specifically, the remote start server 1 stores a URI flag indicating that the start target program starting parameters is the URI information in the flag area shown in FIG. 9.

In a case where URI information is included in a switching program start message, the mobile terminal 5 obtains the actual parameters from the parameter transmission server 6 with reference to the URI information, and reconstructs the start target program start message from the actual parameters and the start target program ID. It should be noted that when the actual parameters are to be obtained from the parameter transmission server 6, download processing in accordance with HTTP protocols is execute.

(Operation of Remote Start Server)

Figure 21:
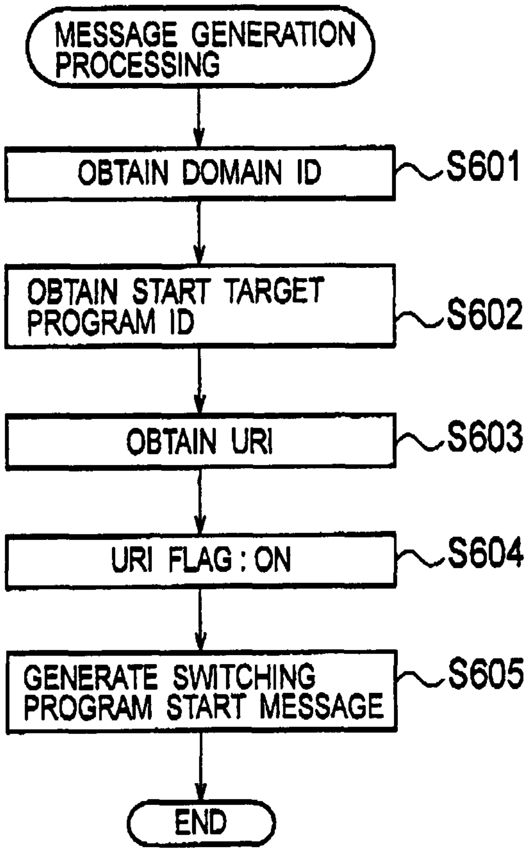
FIG. 21 is a flowchart showing an operation of a remote start server according to the third embodiment of the present invention.

FIG. 21 is a flowchart showing an operation of a remote start server 1 according to the third embodiment.

In step S601, the remote start server 1 obtains a domain ID corresponding to a user ID included in a start request from the domain information storage unit 13.

In step S602, the remote start server 1 obtains a start target program ID.

In step S603, the remote start server 1 obtains, from the parameter transmission server 6, for example, the URI corresponding to the start target program ID obtained in step S602.

In step S604, the remote server 1 sets the URI flag to ON.

In step S605, the remote start server 1 generates a switching program start message.

(Operation of Mobile Terminal)

Figure 22:
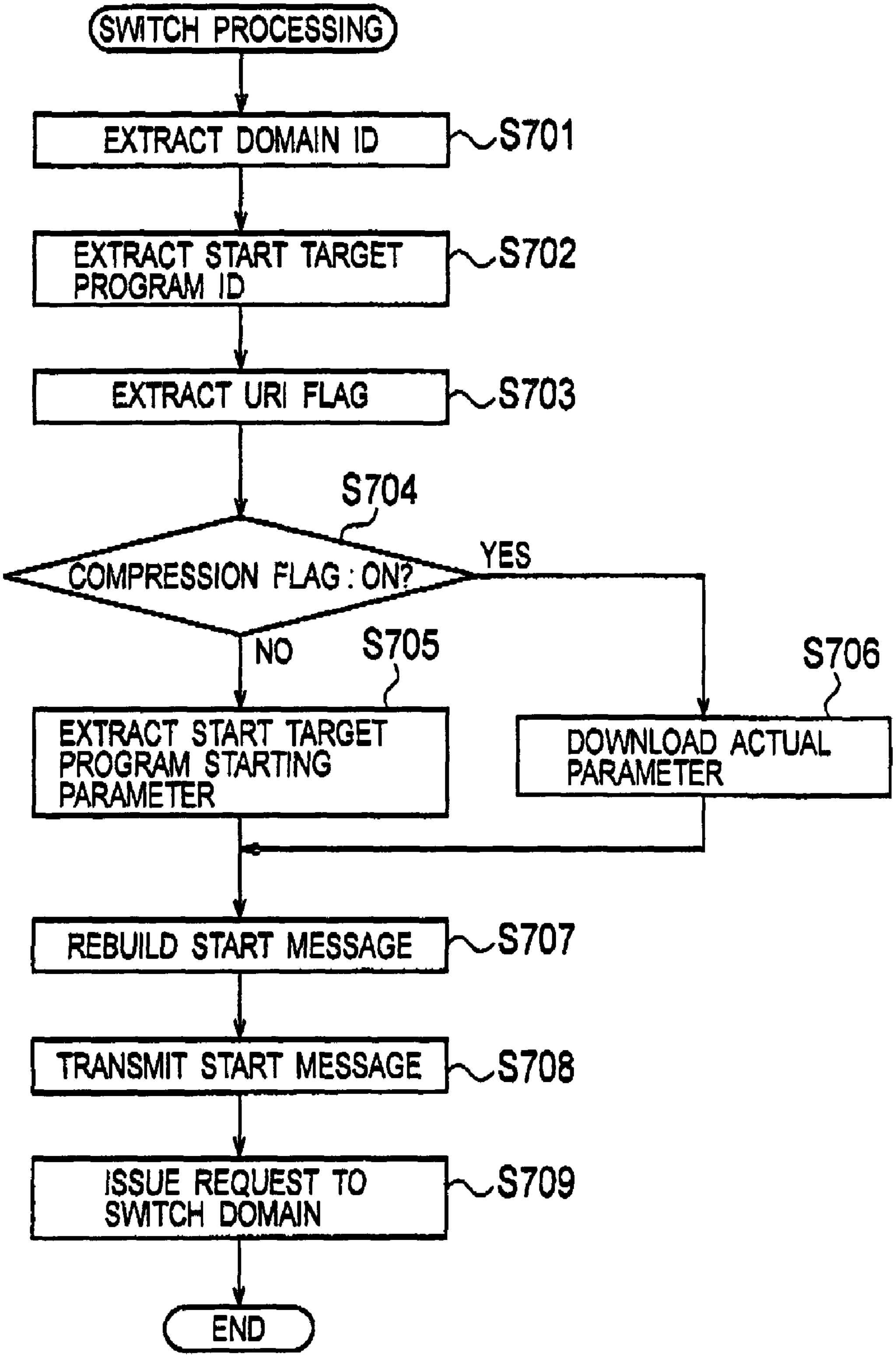
FIG. 22 is a flowchart showing an operation of a mobile terminal according to the third embodiment of the present invention.

FIG. 22 is a flowchart showing an operation of the mobile terminal 5.

In step S701, the mobile terminal 5 extracts the domain ID stored in switching program starting parameters.

In step S702, the mobile terminal 5 extracts the start target program ID stored in the switching program starting parameters.

In step S703, the mobile terminal 5 extracts the URI flag stored in the switching program starting parameters.

In step S704, the mobile terminal 5 determines whether or not the URI flag extracted in step S703 is ON. In a case where the URI flag is determined to be ON, the operation proceeds to the processing in step S706. On the other hand, in a case where the URI flag is determined to be OFF, the operation proceeds to the processing in step S705.

In step S705, the mobile teal 5 extracts the start target program starting parameters.

In step S706, the mobile terminal 5 downloads the actual parameters of the start target program starting parameters.

The processing in respective steps S707 to S709 is the same as that in respective steps S304 to S306 of FIG. 13. Accordingly, the descriptions of the overlapping portions of the processing are omitted here.

(Effects and Advantages)

According to the third embodiment, URI information is stored as start target program starting parameters, and the actual start target program starting parameters are arranged on the NW 4. Accordingly, an adverse increase in communication traffic and communication costs due to an increase in the data length of a switching program start message can be avoided.

Other Embodiments

Although the present invention has been described by the above-mentioned embodiments, the descriptions and drawings that constitute a part of this disclosure should not be understood as to limit the scope of the present invention. For those who are skilled in the art, various alternative embodiments, examples, and operating techniques will be apparent from this disclosure.

Although the examples each employing the mobile terminal 5 are described in the aforementioned embodiments, it is not limited to the mobile terminal 5. A fixed terminal can be also used.

In addition, in the aforementioned embodiments, the remote start server 1, the WAP Push GW 2 and the SMS server 3 are individually provided. The functions of each of the remote start server 1, the WAP Push GW 2 and the SMS server 3, however, may be implemented in a single server.

In the aforementioned embodiments, the descriptions are given of the case where the switching program 516 in the program execution domain 51 receives a switching program start message for starting the program 527 in the program execution domain 52. On the other hand, in a case where the switching program 516 receives a switching program start message for starting the program 517 in its own program execution domain 51, the program start message received by the switching program 516 is to be forwarded to the program starting unit 516 without switching the domains.

As described, it should be understood that the present invention includes various embodiments not listed in this description as a matter of course. Accordingly, the technical scope of the present invention is defined by the matters to define the invention according to the scope of claims appropriate from the aforementioned descriptions.

What is claimed is:

1. A remote start system comprising:

a communication terminal capable of switching a plurality of program execution domains from one to another; and a remote start server configured to instruct, via a network, the communication terminal to start a start target program, wherein the remote start server includes a generator configured to generate a first start message for requesting the communication terminal to start a switching program that switches a program execution domain to a specific program execution domain for executing the start target program, the first start message includes, a wireless datagram protocol (WDP) header, a wireless session protocol (WSP) header having a first program identifier for identifying the switching program, a wireless application protocol (WAP) message having a first program starting parameter used by the switching program, and a second program starting parameter used by the start target program, the first program starting parameter including a second program identifier for identifying the start target program, a domain identifier for identifying the specific program execution domain to thereby switch the communication terminal to the specific program execution domain, and flags associated with a compression processing of the first and second program starting parameters, and each of the program execution domains of the communication terminal includes, a reconstructing unit configured to execute the switching program on the basis of the first start message in a case where the first start message is received, and then to reconstruct a second start message, separate from the first message, for requesting the specific program execution domain to start the start target program by extracting the second program identifier from the first program starting parameter in the WAP message; and a starting unit configured to start the execution target program on the basis of the second start message in a case where the second start message is received, the second start message including the second program identifier, and the second program starting parameter.

2. A remote start server configured to instruct, via a network, a communication terminal capable of switching a plurality of program execution domains from one to another to start a start target program, the remote start server comprising:

a generator configured to generate a first start message for requesting the communication terminal to start a switching program that switches a program execution domain to a specific program execution domain for executing the start target program, wherein the first start message includes, a wireless datagram protocol (WDP) header, a wireless session protocol (WSP) header having a first program identifier for identifying the switching program, a wireless application protocol (WAP) message having a first program starting parameter used by the switching program, and a second program starting parameter used by the start target program, the first program starting parameter including a second program identifier for identifying the start target program, a domain identifier for identifying the specific program execution domain to thereby switch the communication terminal to the specific program execution domain, and flags associated with a compression processing of the first and second program starting parameters.

3. The remote start server according to claim 2, wherein the first program starting parameter includes a compression flag indicating whether or not the second program starting parameter has been subjected to compression processing, and the generator performs compression processing for the second program starting parameter and sets the value of the compression flag to indicate that the parameter has been subjected to the compression processing, in a case where the data length of the second program starting parameter is greater than a specified value.

4. The remote start server according to claim 3, wherein the generator controls the compression processing in accordance with the second program identifier.

5. The remote start server according to claim 2, wherein the generator stores, in the first start message, location information indicating the location, on the network, of the second program starting parameter as the second program starting parameter, and also stores, in the first program starting parameter, information indicating that the second program starting parameter is the location information.

6. The remote start server according to any one of claims 2 to 5, wherein the first start message is transmitted to the communication terminal via a message transmission server that transmits a WAP (Wireless Application Protocol) Push message, and the generator notifies the message transmission server of a terminal identifier for identifying the communication terminal, the first program identifier, the first program starting parameter, and the second program starting parameter.

7. A communication terminal including a plurality of program execution domains and being instructed by a remote control server, via a network, to start a start target program, communication terminal comprising:

a receiver configured to receive a first start message for requesting the communication terminal to start a switching program that switches a program execution domain to a specific program execution domain for executing the start target program, wherein the first start message includes, a wireless datagram protocol (WDP) header, a wireless session protocol (WSP) header having a first program identifier for identifying the switching program, a wireless application protocol (WAP) message having a first program starting parameter used by the switching program, and a second program starting parameter used by the start target program, the first program starting parameter including a second program identifier for identifying the start target program, a domain identifier for identifying the specific program execution domain to thereby switch the communication terminal to the specific program execution domain, and flags associated with a compression processing of the first and second program starting parameter, and each of the program execution domains of the communication terminal includes, a reconstructing unit configured to execute the switching program on the basis of the first start message in a case where the first start message is received, and then to reconstruct a second start message, separate from the first message, for requesting the specific program execution domain to start the start target program by extracting the second program identifier from the first program starting parameter in the WAP message; and a starting unit configured to start the execution target program on the basis of the second start message in a case where the second start message is received, the second start message including the second program identifier, and the second program starting parameter.

8. The communication terminal according to claim 7, wherein the first program starting parameter includes a compression flag indicating whether or not the second program starting parameter has been subjected to compression processing, and the reconstructing unit reconstructs the second start message after performing decompression processing for the second program starting parameter, in a case where the compression flag indicates that the second program starting parameter has been subjected to the compression processing.

9. The communication terminal according to claim 8, wherein the reconstructing unit controls the decompression processing in accordance with the second program identifier.

10. The communication terminal according to claim 7, wherein the first start message stores, in the first start message, location information indicating the location, on the network, of the second program starting parameter as the second program starting parameter, and also stores, in the first program starting parameter, information indicating that the second program starting parameter is the location information, and the reconstructing unit obtains an actual parameter on the basis of the location information in a case where the information indicating that the second program starting parameter is the location information is stored in the first start message, and reconstructs the second start message from the obtained actual parameter and the second program identifier.

11. The communication terminal according to any one of claims 7 to 10, wherein each of the program execution domains further includes a receiver configured to receive the first start message by use of a WAP (Wireless Application Protocol) Push message, the first program identifier is stored in the message header of the WAP Push message, and the first program starting parameter and the second program starting parameter are stored in the main message content of the WAP Push message.

* * * * *